United States Patent
Zhang

(10) Patent No.: US 12,194,923 B2
(45) Date of Patent: Jan. 14, 2025

(54) VEHICULAR TRAILER HITCHING ASSIST SYSTEM WITH HITCH BALL LOCATION ESTIMATION

(71) Applicant: Magna Electronics Inc., Auburn Hills, MI (US)

(72) Inventor: Liang Zhang, Ottawa (CA)

(73) Assignee: Magna Electronics Inc., Auburn Hills, MI (US)

( * ) Notice: Subject to any disclaimer, the term of this patent is extended or adjusted under 35 U.S.C. 154(b) by 137 days.

(21) Appl. No.: 17/453,274

(22) Filed: Nov. 2, 2021

(65) Prior Publication Data

US 2022/0134951 A1     May 5, 2022

Related U.S. Application Data

(60) Provisional application No. 63/198,685, filed on Nov. 4, 2020.

(51) Int. Cl.
| | |
|---|---|
| *B60R 1/26* | (2022.01) |
| *G06T 7/73* | (2017.01) |
| *H04N 25/76* | (2023.01) |

(52) U.S. Cl.
CPC .................. *B60R 1/26* (2022.01); *G06T 7/73* (2017.01); *B60R 2300/308* (2013.01);
(Continued)

(58) Field of Classification Search
CPC ..... B60R 2300/808; B60R 1/00; B60R 1/003; B60R 11/04; B60R 2300/105; B60R 2300/607; B60R 2300/806; B60R 2300/30; B60R 2300/303; B60R 2300/20; B60R 2300/305; B60R 2300/8086; B60R 2300/8066; B60R 2300/8093; B60R 2011/004; B60R 2300/10; B60R 2300/307; B60R 1/002; B60D 1/36; B60D 1/06; B60D 1/62; B60D 1/245; B60D 1/065; B62D 13/06; B62D 15/0285; B62D 15/025; B62D 15/027; G06T 2207/30252; G06T 7/70; G06T 7/73; G06T 7/60;
(Continued)

(56) References Cited

U.S. PATENT DOCUMENTS

| | | |
|---|---|---|
| 6,690,268 B2 | 2/2004 | Schofield et al. |
| 7,038,577 B2 | 5/2006 | Pawlicki et al. |

(Continued)

*Primary Examiner* — Christopher S Kelley
*Assistant Examiner* — Asmamaw G Tarko
(74) *Attorney, Agent, or Firm* — HONIGMAN LLP

(57) ABSTRACT

A vehicular trailer hitching assist system includes a camera disposed at a rear portion of a vehicle and viewing a hitch ball of a trailer hitch of the vehicle. The system determines a position of the hitch ball within frames of image data, and determines an angle based on a lateral offset distance of the camera relative to the longitudinal centerline of the vehicle and a lateral offset distance of the hitch ball relative to the longitudinal centerline of the vehicle. The system determines height of the hitch ball based on the determined angle and the lateral offset distance of the camera and the lateral offset distance of the hitch ball. The system determines a hitch-ball ground position based on the determined height of the hitch ball. The system utilizes the determined height of the hitch ball and the determined hitch-ball ground position during a hitching maneuver of the vehicle.

21 Claims, 4 Drawing Sheets

(52) U.S. Cl.
CPC ............... *B60R 2300/808* (2013.01); *G06T 2207/20081* (2013.01); *G06T 2207/30252* (2013.01); *H04N 25/76* (2023.01)

(58) Field of Classification Search
CPC ........ G06T 2207/10016; B60W 10/20; B60W 2420/42; B60W 30/18036; B60W 50/14; B60W 10/18; B60W 2050/146; B60W 2300/14; B60W 10/04; G05D 2201/0213; G05D 1/0246; G05D 1/0225; G05D 1/0212
USPC ........ 348/148, 113, 118, 207.99; 701/36, 28
See application file for complete search history.

(56) References Cited

U.S. PATENT DOCUMENTS

| | | | |
|---|---|---|---|
| 7,720,580 B2 | 5/2010 | Higgins-Luthman | |
| 7,855,755 B2 | 12/2010 | Weller et al. | |
| 8,874,317 B2 | 10/2014 | Marczok et al. | |
| 9,085,261 B2 | 7/2015 | Lu et al. | |
| 9,446,713 B2 | 9/2016 | Lu et al. | |
| 9,558,409 B2 | 1/2017 | Pliefke et al. | |
| 10,086,870 B2 | 10/2018 | Gieseke et al. | |
| 10,160,382 B2 | 12/2018 | Pliefke et al. | |
| 10,532,698 B2* | 1/2020 | Potnis | G06N 3/08 |
| 10,552,976 B2 | 2/2020 | Diessner et al. | |
| 10,586,119 B2 | 3/2020 | Pliefke et al. | |
| 10,638,025 B2 | 4/2020 | Gali et al. | |
| 10,706,291 B2 | 7/2020 | Diessner et al. | |
| 10,733,757 B2 | 8/2020 | Gupta et al. | |
| 10,755,110 B2 | 8/2020 | Bajpai | |
| 2005/0193603 A1* | 9/2005 | Schultz | E02F 3/7627 37/417 |
| 2011/0216199 A1* | 9/2011 | Trevino | H04N 7/183 348/148 |
| 2015/0002670 A1 | 1/2015 | Bajpai | |
| 2015/0344028 A1 | 12/2015 | Gieseke et al. | |
| 2016/0082887 A1* | 3/2016 | Turk | B60R 1/00 701/300 |
| 2017/0015312 A1* | 1/2017 | Latotzki | B62D 15/027 |
| 2017/0017848 A1 | 1/2017 | Gupta et al. | |
| 2017/0050672 A1 | 2/2017 | Gieseke et al. | |
| 2017/0217372 A1 | 8/2017 | Lu et al. | |
| 2017/0253237 A1 | 9/2017 | Diessner | |
| 2017/0254873 A1 | 9/2017 | Koravadi | |
| 2017/0317748 A1 | 11/2017 | Krapf | |
| 2017/0329346 A1 | 11/2017 | Latotzki | |
| 2018/0215382 A1 | 8/2018 | Gupta et al. | |
| 2018/0276838 A1 | 9/2018 | Gupta et al. | |
| 2019/0016264 A1* | 1/2019 | Potnis | G06T 7/75 |
| 2019/0064831 A1 | 2/2019 | Gali et al. | |
| 2019/0118860 A1 | 4/2019 | Gali et al. | |
| 2019/0347825 A1 | 11/2019 | Gupta et al. | |
| 2020/0017143 A1* | 1/2020 | Gali | G06T 7/70 |
| 2020/0031398 A1* | 1/2020 | Maruoka | B62D 15/0275 |
| 2020/0130582 A1* | 4/2020 | Wong | B62D 13/06 |
| 2020/0324593 A1* | 10/2020 | Niewiadomski | B60D 1/62 |
| 2020/0334475 A1 | 10/2020 | Joseph et al. | |
| 2020/0356788 A1 | 11/2020 | Joseph et al. | |
| 2020/0361397 A1 | 11/2020 | Joseph et al. | |
| 2020/0406967 A1 | 12/2020 | Yunus et al. | |
| 2021/0078634 A1 | 3/2021 | Jalalmaab et al. | |
| 2021/0107403 A1* | 4/2021 | Gieseke | G06F 3/012 |
| 2021/0129835 A1* | 5/2021 | Viehmann | B62D 9/005 |
| 2021/0170820 A1 | 6/2021 | Zhang | |
| 2021/0170947 A1 | 6/2021 | Yunus et al. | |
| 2021/0274125 A1* | 9/2021 | Ziegenspeck | H04N 7/183 |
| 2022/0024391 A1* | 1/2022 | Gali | G06T 7/73 |
| 2022/0027644 A1* | 1/2022 | Gali | G08G 1/16 |
| 2022/0028111 A1* | 1/2022 | Gali | B60D 1/62 |
| 2022/0134951 A1* | 5/2022 | Zhang | B60R 1/26 348/148 |
| 2022/0135127 A1* | 5/2022 | Lu | B62D 5/04 701/41 |
| 2022/0204081 A1* | 6/2022 | Gali | B62D 15/027 |
| 2023/0001984 A1 | 1/2023 | Lu et al. | |
| 2023/0035968 A1 | 2/2023 | Wodrich et al. | |

* cited by examiner

VEHICULAR TRAILER HITCHING ASSIST SYSTEM WITH HITCH BALL LOCATION ESTIMATION

CROSS REFERENCE TO RELATED APPLICATION

The present application claims the filing benefits of U.S. provisional application Ser. No. 63/198,685, filed Nov. 4, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

Implementations herein provide a driver assistance system or vision system or trailer hitching assist system for a vehicle. The system includes a camera disposed at a rear portion of a vehicle equipped with the vehicular trailer hitching assist system and viewing rearward of the vehicle. The camera views a hitch ball of a trailer hitch of the vehicle. The camera includes a CMOS imaging array that includes at least one million photosensors arranged in rows and columns. The camera captures frames of image data. The system includes an electronic control unit (ECU) including electronic circuitry and associated software. The electronic circuitry of the ECU includes an image processor for processing image data captured by the camera. The vehicular trailer hitching assist system, responsive to image processing at the ECU of image data captured by the camera, determines a position of the hitch ball of the trailer hitch within frames of captured image data. The vehicular trailer hitching assist system, responsive to determining the position of the hitch ball within frames of captured image data, determines an angle of the hitch ball relative to the camera based on (i) a lateral offset distance of the camera relative to a longitudinal centerline of the vehicle and (ii) a lateral offset distance of the hitch ball relative to the longitudinal centerline of the vehicle. The vehicular trailer hitching assist system determines height of the hitch ball from the ground based on (i) the determined angle of the hitch ball relative to the camera, (ii) the lateral offset distance of the camera, and (iii) the lateral offset distance of the trailer hitch. The vehicular trailer hitching assist system determines a hitch-ball ground position based on the determined height of the hitch ball which is a location on the ground below the hitch ball. The vehicular trailer hitching assist system, at least in part responsive to image processing at the ECU of image data captured by the camera, determines a trailer tongue of a trailer that is to be hitched to the hitch ball of the vehicle. The vehicular trailer hitching assist system utilizes the determined height of the hitch ball from the ground and the determined hitch-ball ground position during a hitching maneuver of the vehicle to assist in maneuvering the vehicle toward the trailer tongue of the trailer for hitching the trailer tongue of the trailer to the hitch ball of the vehicle.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or vehicular trailer hitching assist system and/or driving assist system operates to capture images exterior of the vehicle and of a trailer being or to be towed by the vehicle and may process the captured image data to determine a path of travel for the vehicle and trailer or the vehicle toward the trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more sensors (e.g., cameras) and that may provide an output to a display device for displaying images representative of the captured image data. Optionally, the system may provide a display, such as a rearview display or a top down or bird's eye or surround view display or the like.

Figure 1:
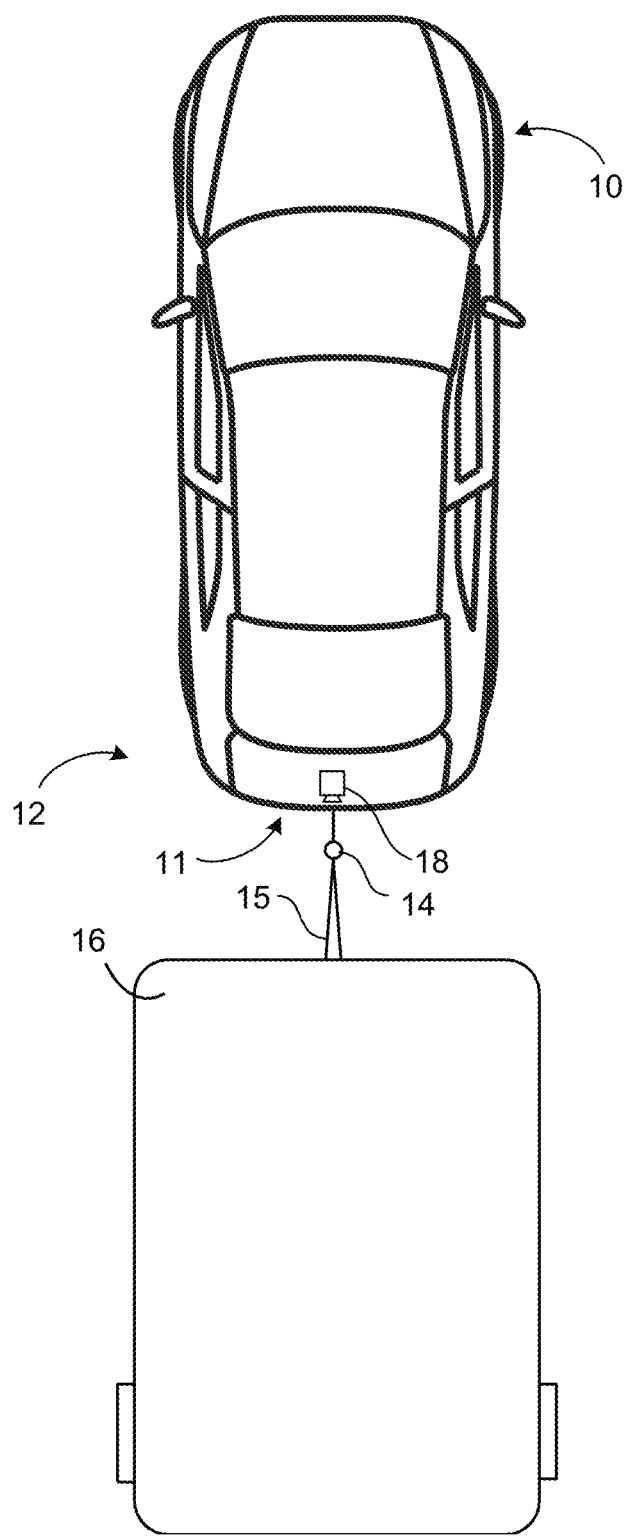
FIG. 1 is a plan view of a vehicle with a trailer assist system for use in hitching a trailer at the vehicle and/or controlling the vehicle and trailer.

Referring now to the drawings and the illustrative embodiments depicted therein, a vehicle 10 includes a vehicle and trailer maneuvering system or trailer hitching system 12 that is operable to assist in backing up or reversing the vehicle with a hitched trailer that is hitched at the rear of the vehicle via a hitch 14 or operable to assist in backing up or reversing the vehicle toward a trailer to be hitched, and the system may maneuver the vehicle 10 (and optionally the trailer 16) toward a desired or selected location. The trailer maneuver assist system 12 includes at least one exterior viewing vehicle-based imaging sensor or camera, such as a rearward viewing imaging sensor or camera 18, such as a rear backup camera (and the system may optionally include multiple exterior viewing imaging sensors or cameras, such as a sideward/rearward viewing camera at respective sides of the vehicle), which captures image data representative of the scene exterior and rearward of the vehicle 10, with the field of view of the camera 18 encompassing the hitch 14 and/or trailer 16 and/or trailer coupler 15, and with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control 11 or electronic control unit (ECU) having a processor that is operable to process image data captured by the camera or cameras and that may detect objects or the like and/or provide displayed images (or other visual indication) at a display device for viewing by the driver of the vehicle (the control and/or display device may be part of or incorporated in or at an interior rearview mirror assembly of the vehicle, or the control and/or the display device may be disposed elsewhere at or in the vehicle) a representation of the captured image data. The data transfer or signal communication from the camera 18 to the ECU may comprise any suitable data or communication link (wired and/or wireless), such as a vehicle network bus or the like of the equipped vehicle.

Figure 2:
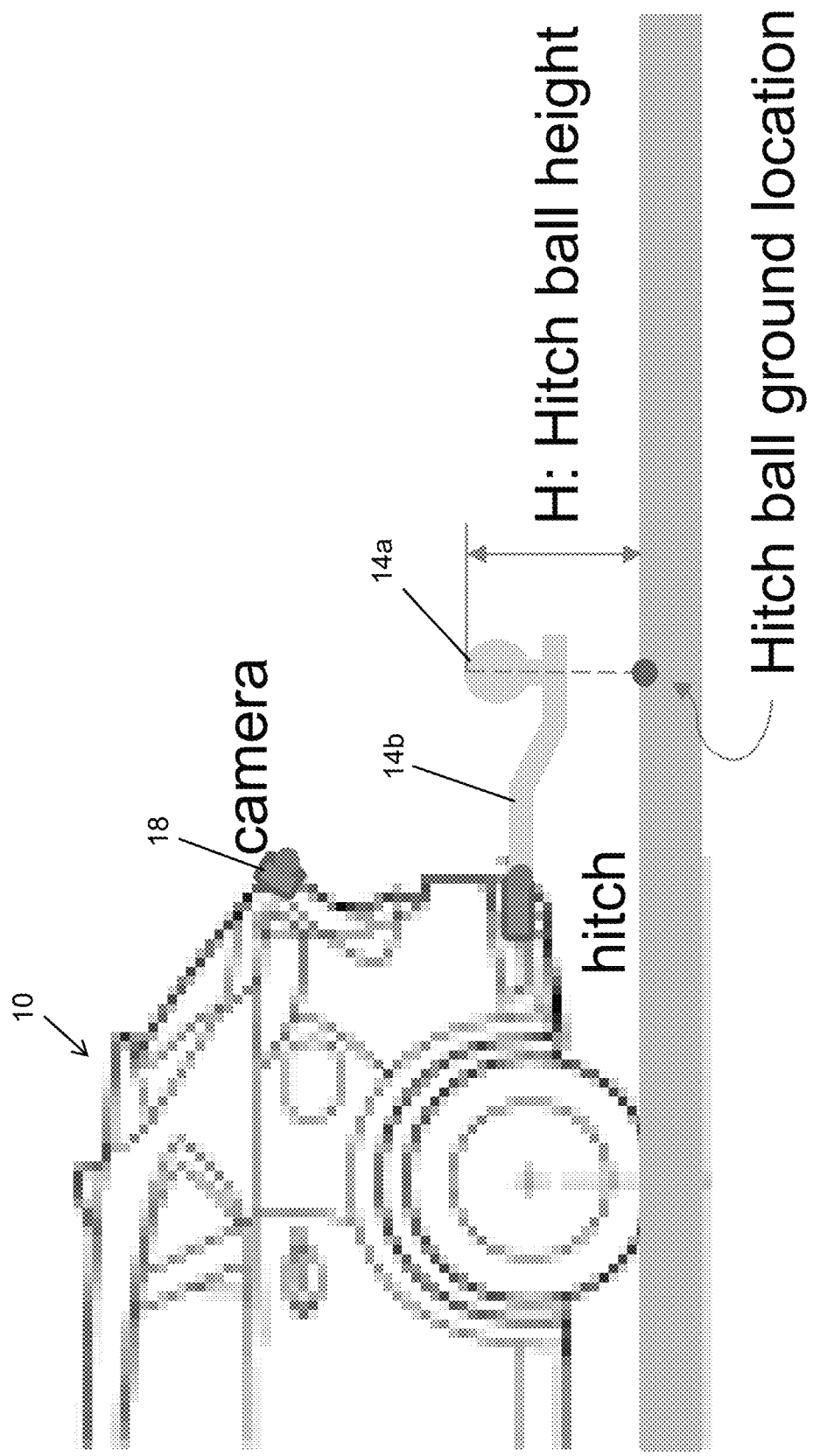
FIG. 2 is a plan view of a vehicle with a hitch that includes a hitch ball a distance above the ground.

As shown in FIG. 2, the trailer hitching assist system may be a dynamic hitch backup assist system. The dynamic hitch backup assist system provides a marketable feature that aids drivers when attempting to line up and attach a trailer to a vehicle. As shown, the vehicle 10 is equipped with the rearward viewing camera 18 and the hitch 14 having a hitch ball 14*a* and a hitch arm 14*b*. The rearward viewing camera 18 has a field of view that views at least a portion of the hitch 14 so that the dynamic hitch backup system may process captured image data that includes the hitch and/or hitch ball. The dynamic hitch backup assist system requires information about the trailer hitch ball height and the hitch-ball ground location relative to the ground in order to be effective. The trailer hitch ball height, as shown, may be indicative of a height of the hitch ball above the ground surface, and the hitch-ball ground location may be indicative of a position along the ground surface corresponding to the position of the hitch ball above the ground surface, the hitch ball height being a vertical distance between the hitch-ball ground location and the hitch ball. However, generally information from only a single camera view is available to the system (i.e., from the rearward viewing backup camera of the host vehicle). Also, the hitch ball projection in the image plane does not change from frame to frame because the hitch is fixed to the host vehicle. In other words, the position of the hitch ball in the captured image data remains constant while other features of the image data change as the vehicle maneuvers within the environment. Furthermore, based on the detected hitch ball image position in the image data captured by the rearward viewing camera, the three-dimensional (3D) position of the hitch ball (i.e., the height and the ground position of the hitch ball) can be reconstructed with a camera projection matrix up to a scale. Thus, an additional ground truth distance is required for the determination of the real height and ground location of the hitch ball. That is, one coordinate of the position of the hitch ball should be related to or derived from the known referenced ground truth distance.

Figure 3:
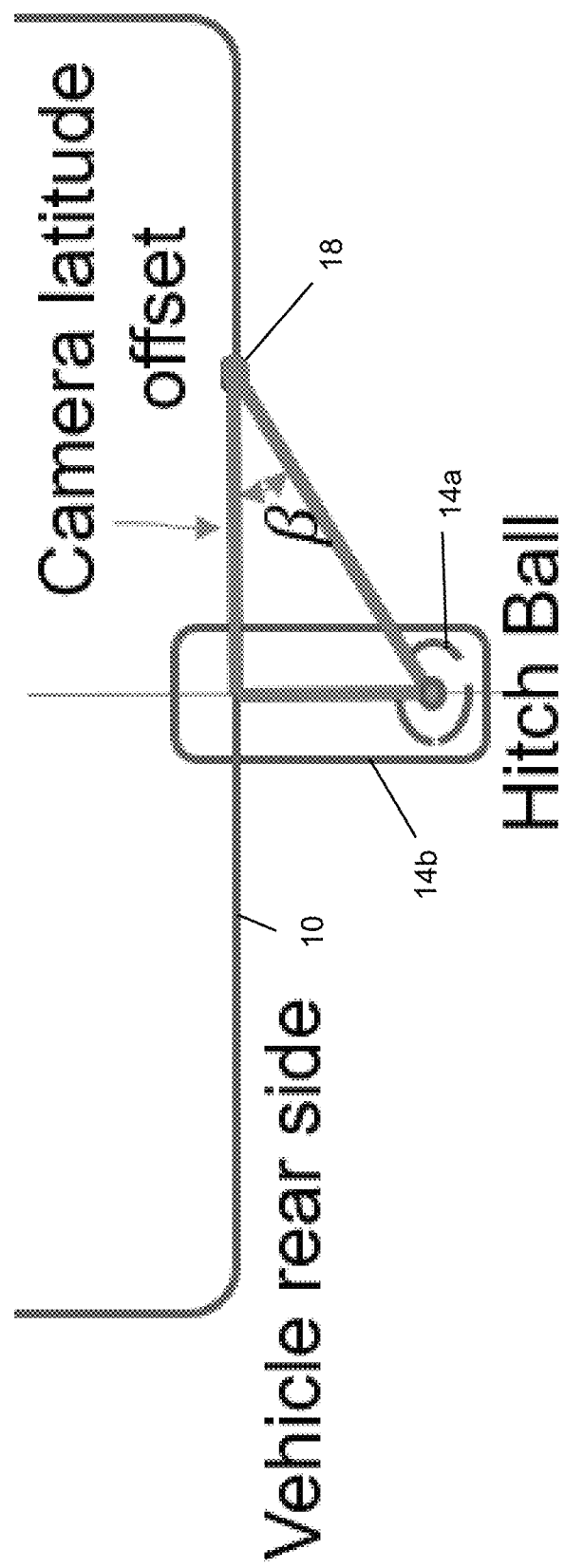
FIG. 3 is a top view of a rear of a vehicle equipped with a hitch and a laterally offset camera.

Referring now to FIG. 3, the system utilizes a top-view triangle of the geometry of the hitch arm 14*b*, hitch ball 14*a*, and vehicle. As shown, the system may make use of a camera lateral offset, which may be the latitude distance or offset of the camera position from a central axis of the vehicle (i.e., the centerline or central longitudinal axis of the vehicle), which is known from the camera mounting. The system may detect or determine the hitch ball image position in one image or multiple images captured by the camera 18. An angle $\beta$ can be determined by camera projective rays passing from the camera 18 through the detected hitch ball image point. Based on the top-view triangle relation (FIG. 3), the arm length of the hitch arm 14*b* can be determined. Based on the determined arm length of the hitch arm, the height of the hitch ball 14*a* can be determined by camera projection geometry and the detected hitch ball image point. Then, the ground location of the hitch ball can be calculated. In other words, because the vertical distance between the camera 18 and hitch 14 is known, an angle $\beta$ can be determined based on captured image data and the length of the hitch arm 14*b* may be determined based on the known camera latitude offset and the angle $\beta$. The determined length of the hitch arm 14*b* may be used to determine the ground location of the hitch ball.

Figure 4:
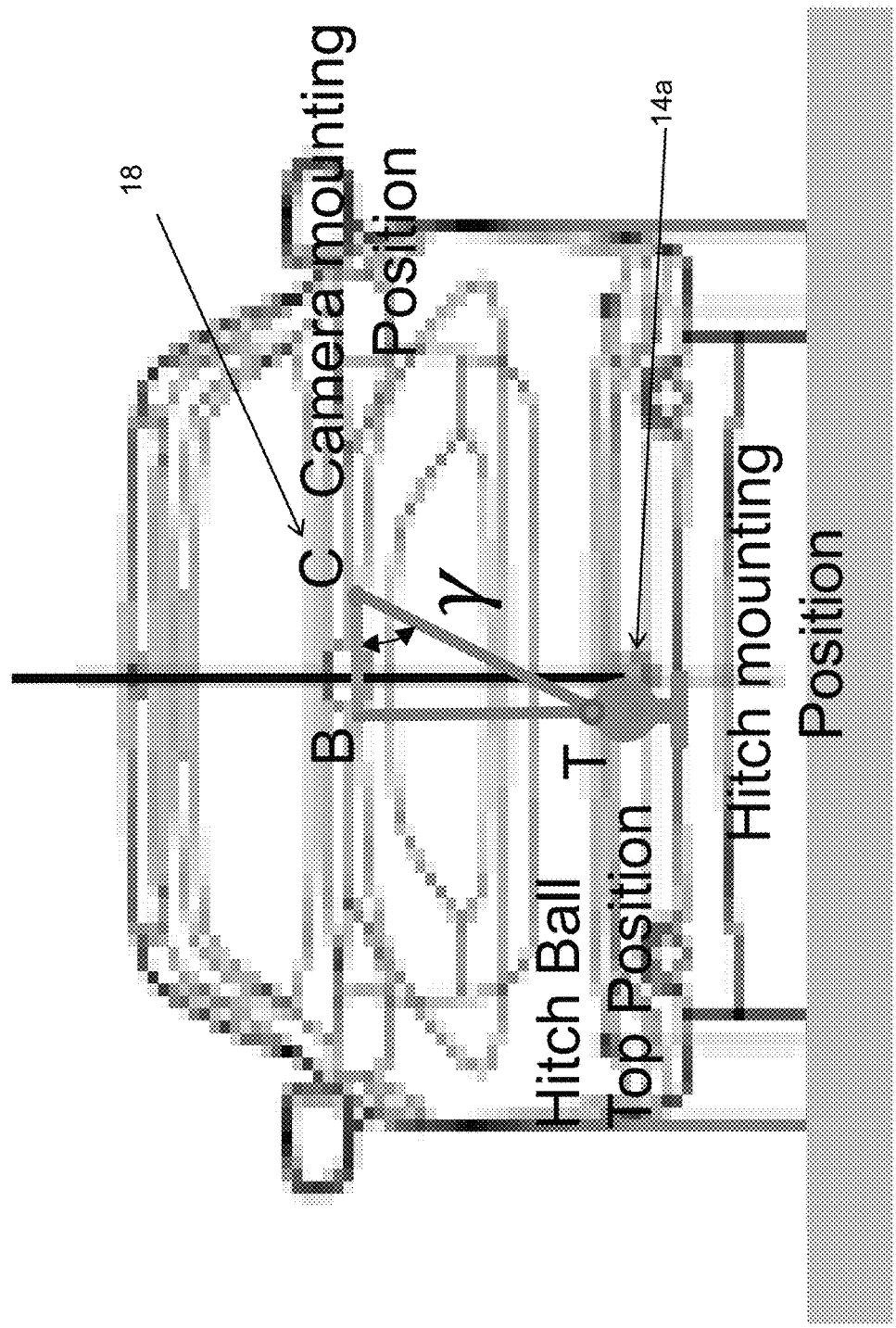
FIG. 4 is a rear view of a vehicle equipped with a laterally offset hitch and a laterally offset camera.

Referring now to FIG. 4, the system may use trailer hitch mounting geometry to determine the height and location of the hitch ball 14*a* based on the mounting point for the rearward viewing camera 18 (e.g., a rear backup camera or another camera disposed at the rear of the vehicle and viewing rearward of the vehicle) and the trailer hitch 14 based on the assumption that the mounting point of the rearward viewing camera 18 and the mounting point of the hitch 14 have a non-zero latitude offsets. In the example of FIG. 4, point B is at a latitude offset of the mounted hitch relative to a vertical vehicle central line and point C is at a latitude offset of the mounted rearward viewing camera 18 to the vertical vehicle central line. Thus, point B represents the lateral offset of the mounting position of the hitch 14 relative to the vertical vehicle central line or axis and point C represents the lateral offset of the mounting position of the camera 18 relative to the vertical vehicle central line or axis.

Based on the known lateral offset distances of the camera 18 and the mounted hitch 14 relative to the vertical vehicle central line (which may be zero when mounted along the central axis of the vehicle) and known camera calibration information (e.g., projection matrix), the system determines the ground position of the hitch ball. Optionally, either the latitude offset (i.e., the lateral offset distance) of the camera from the vertical vehicle center line or the hitch from the vertical vehicle center line may be zero while the other is non-zero (i.e., a distance greater than zero from the vehicle centerline toward one side of the vehicle). That is, when the lateral offset distance of the camera is zero, the lateral offset distance of the hitch is non-zero and, vice versa, when the lateral offset distance of the hitch is zero, the lateral offset distance of the camera is non-zero.

Based on this determined information, the vehicular trailer hitching assist system detects the hitch ball image position in one frame of image data captured by the rearward viewing camera by using, for example, a feature detection algorithm or artificial intelligence (AI) or machine learning (ML) based feature detection. The system determines an angle $\gamma$ from a camera projective ray passing through the detected hitch ball image position (based on the known camera projection matrix). Based on the rearview triangle relationship (i.e., the known lateral offsets of the hitch and the rearward viewing camera from the vertical vehicle central line and the determined angle $\gamma$ of the camera relative to the hitch ball), the system determines a distance from point T to point B (i.e., the length of the line connecting Point B and Point T) based on the distance between point B and point C (i.e., the length of the line connecting point B and point C), where the point T represents the position of the hitch ball 14*a*. That is, the angle $\gamma$ is determined between a first line that intersects the camera mounting position and the determined position of the hitch ball and a second line that is parallel to the ground and intersects the camera mounting position. The distance between point B and point C is determined based on the known lateral offsets of the camera and hitch and the determined angle $\gamma$.

The system estimates or calculates or determines the height of the hitch ball 14*a* from the ground based on the calibrated camera mounting position and the calculated distance between point B and point C. With the estimated height of the hitch ball and the detected image position, the system calculates or determines the ground position of the hitch ball using camera projection geometry. The height and ground position of the hitch ball is used in guiding the vehicle towards a trailer tongue of a trailer to hitch the trailer to the vehicle.

Optionally, to reduce error related to hitch ball detection, the system may repeat detecting the hitch ball, determining the angle γ, determining the distance between point B and point C, and determining the height of the hitch ball for multiple frames of image data (e.g., multiple consecutive image frames). The system may average each determined hitch ball height (i.e., the hitch ball height determined from each of the multiple frames). Using the average height, the system may determine the ground location of the hitch ball using the camera projection matrix with the detected hitch ball image position.

Additionally, or alternatively, the system may also reduce error related to hitch ball detection by determining multiple candidate hitch ball image positions either by using different feature detection algorithms (i.e., using multiple feature detection algorithms to determine multiple candidate hitch ball image positions) and/or selecting several additional neighbor points around one detected hitch ball image position. For each candidate hitch ball image position, the system may determine the angle γ, determine the distance between point B and point C, and determine the height of the hitch ball. The system may determine the final height of the hitch ball by averaging all of the estimated hitch heights from the different detection algorithms used. Using the average height, the system determines the ground location of the hitch ball by the camera projection matrix with the detected image ball.

Thus, the vehicular trailer hitching assist system described herein determines the height and ground location of a hitch ball of a hitch mounted to a host vehicle. The system uses known information that includes latitude offsets and lateral offsets of the hitch and a rearward viewing camera to detect the hitch ball image position, determine one or more angles of the camera relative to the hitch ball based on the latitude offsets and the lateral offsets, and, based on triangle relationships, determine the height of the hitch ball to the ground and the ground position of the hitch ball.

The system may determine a trailer tongue at least in part responsive to image processing of image data captured by the rearward viewing camera. The height and ground position of the hitch ball is used by the trailer hitching assist system in guiding the vehicle towards the trailer tongue of a trailer to hitch the trailer to the vehicle. For example, the trailer hitching assist system (responsive to processing image data captured by the rearward viewing camera and based on the determined height and ground position of the hitch ball) may display a graphic overlay (e.g., at a video display screen in the vehicle that displays rearward video images for viewing by a driver of the vehicle, with the video images derived from image data captured by a rearward viewing camera of the vehicle) of a target path of the reversing vehicle toward the trailer tongue of the trailer to assist the driver of the vehicle in maneuvering the vehicle toward the trailer tongue of the trailer for hitching the trailer to the vehicle. Optionally, the trailer hitching assist system (responsive to processing image data captured by the rearward viewing camera and based on the determined height and ground position of the hitch ball) may control steering and/or braking of the vehicle to guide or maneuver the vehicle toward the trailer tongue of the trailer for hitching the trailer to the vehicle.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2021-0170947; US-2021-0170820; US-2021-0078634; US-2020-0406967; US-2020-0361397; US-2020-0356788; US-2020-0334475; US-2020-0017143; US-2019-0347825; US-2019-0118860; US-2019-0064831; US-2018-0276838; US-2018-0215382; US-2017-0254873; US-2017-0217372 and/or US-2015-0002670, and/or U.S. patent application Ser. No. 17/443,258, filed Jul. 23, 2021, Ser. No. 17/443,257, filed Jul. 23, 2021, Ser. No. 17/443,256, filed Jul. 23, 2021, and/or U.S. provisional application Ser. No. 63/199,155, filed Dec. 10, 2020, and/or International Publication No. WO 2021/0127693, which are all hereby incorporated herein by reference in their entireties.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017848; US-2017-0015312 and/or US-2015-0344028, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns.

The imaging array may comprise a CMOS imaging array having at least 300,000 photosensor elements or pixels, preferably at least 500,000 photosensor elements or pixels and more preferably at least 1 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer hitching assist system, the vehicular trailer hitching assist system comprising:
   a camera disposed at a rear portion of a vehicle equipped with the vehicular trailer hitching assist system and viewing rearward of the vehicle, the camera viewing a hitch ball of a trailer hitch of the vehicle;
   wherein the camera comprises a CMOS imaging array, and wherein the CMOS imaging array comprises at least one million photosensors arranged in rows and columns;
   wherein the camera captures frames of image data;
   an electronic control unit (ECU) comprising electronic circuitry and associated software;
   wherein the electronic circuitry of the ECU comprises an image processor for processing image data captured by the camera;
   wherein the vehicular trailer hitching assist system, responsive to image processing at the ECU of image data captured by the camera, determines a position of the hitch ball of the trailer hitch within frames of captured image data;
   wherein the vehicular trailer hitching assist system, responsive to determining the position of the hitch ball within frames of captured image data, determines an angle of the hitch ball relative to the camera based on (i) a lateral offset distance of the camera relative to a longitudinal centerline of the vehicle, (ii) a lateral offset distance of the hitch ball relative to the longitudinal centerline of the vehicle and (iii) image processing at the ECU of image data captured by the camera;
   wherein the vehicular trailer hitching assist system determines height of the hitch ball from the ground based on (i) the determined angle of the hitch ball relative to the camera, (ii) the lateral offset distance of the camera, and (iii) the lateral offset distance of the trailer hitch;
   wherein the vehicular trailer hitching assist system determines a hitch-ball ground position based on the determined height of the hitch ball, and wherein the determined hitch-ball ground position is a location on the ground below the hitch ball;
   wherein the vehicular trailer hitching assist system, at least in part responsive to image processing at the ECU of image data captured by the camera, determines a trailer tongue of a trailer that is to be hitched to the hitch ball of the vehicle; and
   wherein the vehicular trailer hitching assist system utilizes the determined height of the hitch ball from the ground and the determined hitch-ball ground position during a hitching maneuver of the vehicle to assist in maneuvering the vehicle toward the trailer tongue of the trailer for hitching the trailer tongue of the trailer to the hitch ball of the vehicle.

2. The vehicular trailer hitching assist system of claim 1, wherein the lateral offset distance of the trailer hitch is zero and the lateral offset distance of the camera is non-zero.

3. The vehicular trailer hitching assist system of claim 1, wherein the lateral offset distance of the trailer hitch is non-zero and the lateral distance offset of the camera is zero.

4. The vehicular trailer hitching assist system of claim 1, wherein the camera comprises a rear backup camera of the vehicle.

5. The vehicular trailer hitching assist system of claim 1, wherein the vehicular trailer hitching assist system determines an average hitch-ball ground position based on an average of a plurality of determined heights of the hitch ball from the ground as determined via processing at the ECU of a plurality of frames of captured image data.

6. The vehicular trailer hitching assist system of claim 1, wherein, during the hitching maneuver of the vehicle, the vehicular trailer hitching assist system maneuvers the vehicle toward the trailer tongue of the trailer to be hitched to the hitch ball of the vehicle based at least in part on the determined hitch-ball ground position of the hitch ball and the determined trailer tongue of the trailer that is to be hitched to the hitch ball of the vehicle.

7. The vehicular trailer hitching assist system of claim 1, comprising a video display screen disposed in the vehicle and viewable by a driver of the vehicle, the video display screen displaying video images derived at least in part from image data captured by the camera during the hitching maneuver of the vehicle, wherein the vehicular trailer hitching assist system generates a graphic overlay for display at the video display screen based at least in part on the determined hitch-ball ground position of the hitch ball and the determined trailer tongue of the trailer that is to be hitched to the hitch ball of the vehicle, and wherein the graphic overlay provides guidance for the driver during the hitching maneuver of the vehicle.

8. The vehicular trailer hitching assist system of claim 1, wherein the vehicular trailer hitching assist system determines the position of the hitch ball within frames of captured image data using a machine-learning feature detection algorithm.

9. The vehicular trailer hitching assist system of claim 1, wherein the vehicular trailer hitching assist system determines the angle of the hitch ball relative to the camera based on a projective ray passing through the determined position of the hitch ball based on a camera projection matrix.

10. The vehicular trailer hitching assist system of claim 1, wherein the angle of the hitch ball relative to the camera is determined between (i) a first line that intersects a camera mounting position and the determined position of the hitch ball and (ii) a second line that is parallel to the ground and intersects the camera mounting position.

11. The vehicular trailer hitching assist system of claim 1, wherein the vehicular trailer hitching assist system determines the position of the hitch ball within frames of image data based on a triangular relationship between the determined angle of the hitch ball relative to the camera, the lateral offset distance of the camera, and the lateral offset distance of the trailer hitch.

12. The vehicular trailer hitching assist system of claim 1, wherein the vehicular trailer hitching assist system determines the hitch-ball ground position using camera projection geometry.

13. The vehicular trailer hitching assist system of claim 1, wherein the vehicular trailer hitching assist system determines the position of the hitch ball within frames of image data using a plurality of different algorithms, and wherein the vehicular trailer hitching assist system averages the determined positions of the hitch ball as determined using the plurality of different algorithms.

14. A vehicular trailer hitching assist system, the vehicular trailer hitching assist system comprising:
   a rear backup camera disposed at a rear portion of a vehicle equipped with the vehicular trailer hitching assist system and viewing rearward of the vehicle, the rear backup camera viewing a hitch ball of a trailer hitch of the vehicle;
   wherein the rear backup camera comprises a CMOS imaging array, and wherein the CMOS imaging array comprises at least one million photosensors arranged in rows and columns;
   wherein the rear backup camera captures frames of image data;
   an electronic control unit (ECU) comprising electronic circuitry and associated software;
   wherein the electronic circuitry of the ECU comprises an image processor for processing image data captured by the rear backup camera;
   wherein the vehicular trailer hitching assist system, responsive to image processing at the ECU of image data captured by the rear backup camera, determines a position of the hitch ball of the trailer hitch within frames of captured image data;
   wherein the vehicular trailer hitching assist system, responsive to determining the position of the hitch ball within frames of captured image data, determines an angle of the hitch ball relative to the rear backup camera based on (i) a lateral offset distance of the rear backup camera relative to a longitudinal centerline of the vehicle, (ii) a lateral offset distance of the hitch ball relative to the longitudinal centerline of the vehicle and (iii) image processing at the ECU of image data captured by the camera;
   wherein the vehicular trailer hitching assist system determines height of the hitch ball from the ground based on (i) the determined angle of the hitch ball relative to the rear backup camera, (ii) the lateral offset distance of the rear backup camera, and (iii) the lateral offset distance of the trailer hitch;
   wherein the vehicular trailer hitching assist system determines a hitch-ball ground position based on the determined height of the hitch ball, and wherein the determined hitch-ball ground position is a location on the ground below the hitch ball;
   wherein the vehicular trailer hitching assist system, at least in part responsive to image processing at the ECU of image data captured by the rear backup camera, determines a trailer tongue of a trailer that is to be hitched to the hitch ball of the vehicle;
   wherein the vehicular trailer hitching assist system determines an average hitch-ball ground position based on an average of a plurality of determined heights of the hitch ball from the ground as determined via processing at the ECU of a plurality of frames of captured image data; and
   wherein the vehicular trailer hitching assist system utilizes the determined height of the hitch ball from the ground and the determined hitch-ball ground position during a hitching maneuver of the vehicle to assist in maneuvering the vehicle toward the trailer tongue of the trailer for hitching the trailer tongue of the trailer to the hitch ball of the vehicle.

15. The vehicular trailer hitching assist system of claim 14, wherein the lateral offset distance of the trailer hitch is zero and the lateral offset distance of the rear backup camera is non-zero.

16. The vehicular trailer hitching assist system of claim 14, wherein the lateral offset distance of the trailer hitch is non-zero and the lateral distance offset of the rear backup camera is zero.

17. The vehicular trailer hitching assist system of claim 14, wherein, during the hitching maneuver of the vehicle, the vehicular trailer hitching assist system maneuvers the vehicle toward the trailer tongue of the trailer to be hitched to the hitch ball of the vehicle based at least in part on the determined hitch-ball ground position of the hitch ball and the determined trailer tongue of the trailer that is to be hitched to the hitch ball of the vehicle.

18. The vehicular trailer hitching assist system of claim 14, comprising a video display screen disposed in the vehicle and viewable by a driver of the vehicle, the video display screen displaying video images derived at least in part from image data captured by the rear backup camera during the hitching maneuver of the vehicle, wherein the vehicular trailer hitching assist system generates a graphic overlay for display at the video display screen based at least in part on the determined hitch-ball ground position of the hitch ball and the determined trailer tongue of the trailer that is to be hitched to the hitch ball of the vehicle, and wherein the graphic overlay provides guidance for the driver during the hitching maneuver of the vehicle.

19. A vehicular trailer hitching assist system, the vehicular trailer hitching assist system comprising:

a camera disposed at a rear portion of a vehicle equipped with the vehicular trailer hitching assist system and viewing rearward of the vehicle, the camera viewing a hitch ball of a trailer hitch of the vehicle;

wherein the camera comprises a CMOS imaging array, and wherein the CMOS imaging array comprises at least one million photosensors arranged in rows and columns;

wherein the camera captures frames of image data;

an electronic control unit (ECU) comprising electronic circuitry and associated software;

wherein the electronic circuitry of the ECU comprises an image processor for processing image data captured by the camera;

wherein the vehicular trailer hitching assist system, responsive to image processing at the ECU of image data captured by the camera, determines a position of the hitch ball of the trailer hitch within frames of captured image data;

wherein the vehicular trailer hitching assist system determines the position of the hitch ball within frames of captured image data using a machine-learning feature detection algorithm;

wherein the vehicular trailer hitching assist system, responsive to determining the position of the hitch ball within frames of captured image data, determines an angle of the hitch ball relative to the camera based on (i) a lateral offset distance of the camera relative to a longitudinal centerline of the vehicle, (ii) a lateral offset distance of the hitch ball relative to the longitudinal centerline of the vehicle and (iii) image processing at the ECU of image data captured by the camera;

wherein the vehicular trailer hitching assist system determines height of the hitch ball from the ground based on (i) the determined angle of the hitch ball relative to the camera, (ii) the lateral offset distance of the camera, and (iii) the lateral offset distance of the trailer hitch;

wherein the vehicular trailer hitching assist system determines a hitch-ball ground position based on the determined height of the hitch ball, and wherein the determined hitch-ball ground position is a location on the ground below the hitch ball;

wherein the vehicular trailer hitching assist system determines the hitch-ball ground position using camera projection geometry;

wherein the vehicular trailer hitching assist system, at least in part responsive to image processing at the ECU of image data captured by the camera, determines a trailer tongue of a trailer that is to be hitched to the hitch ball of the vehicle; and wherein the vehicular trailer hitching assist system utilizes the determined height of the hitch ball from the ground and the determined hitch-ball ground position during a hitching maneuver of the vehicle to assist in maneuvering the vehicle toward the trailer tongue of the trailer for hitching the trailer tongue of the trailer to the hitch ball of the vehicle.

20. The vehicular trailer hitching assist system of claim 19, wherein the vehicular trailer hitching assist system determines the angle of the hitch ball relative to the camera based on a projective ray passing through the determined position of the hitch ball based on a camera projection matrix.

21. The vehicular trailer hitching assist system of claim 19, wherein the angle of the hitch ball relative to the camera is determined between (i) a first line that intersects a camera mounting position and the determined position of the hitch ball and (ii) a second line that is parallel to the ground and intersects the camera mounting position.

* * * * *